US009742929B2

(12) United States Patent
Zakharov

(10) Patent No.: US 9,742,929 B2
(45) Date of Patent: Aug. 22, 2017

(54) IDENTIFYING PROBLEMATIC PRINTERS BY APPLYING MARKOV CHAIN MODEL

(71) Applicant: KYOCERA Document Solutions Inc., Osaka (JP)

(72) Inventor: Oleg Y. Zakharov, Walnut Creek, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/964,123

(22) Filed: Dec. 9, 2015

(65) Prior Publication Data
US 2017/0171400 A1 Jun. 15, 2017

(51) Int. Cl.
*H04N 1/00* (2006.01)
*H04N 1/32* (2006.01)

(52) U.S. Cl.
CPC ..... *H04N 1/00042* (2013.01); *H04N 1/00007* (2013.01); *H04N 1/00832* (2013.01); *H04N 1/32539* (2013.01); *H04N 2201/0094* (2013.01); *H04N 2201/3215* (2013.01)

(58) Field of Classification Search
None
See application file for complete search history.

(56) References Cited

U.S. PATENT DOCUMENTS

| 8,407,163 | B2 | 3/2013 | Andreoli | |
| 2007/0014614 | A1* | 1/2007 | Yoshida | G03G 15/5016 400/62 |
| 2007/0268509 | A1* | 11/2007 | Andreoli | G06F 11/0733 358/1.14 |
| 2008/0082461 | A1* | 4/2008 | Kamata | G06Q 10/10 705/408 |
| 2013/0048706 | A1* | 2/2013 | Nahill | G06K 7/10554 235/375 |

* cited by examiner

*Primary Examiner* — Fan Zhang
(74) *Attorney, Agent, or Firm* — McDonnell Boehnen Hulbert & Berghoff LLP

(57) ABSTRACT

Systems and methods for identifying problematic printers are provided. An example method can involve determining a time interval for a printing device. The method may also involve determining a number of pages printed by the printing device during the time interval. The method may also involve determining a number of printing-device errors that occur on the printing device during the time interval. Still further, the method may involve determining one or more coefficients of a Markov chain based on the number of pages printed by the printing device during the time interval and the number of printing-device errors that occur on the printing device during the time interval. The method yet further includes, based on the determined coefficients of the Markov chain, determining an operational status of the printing device.

16 Claims, 7 Drawing Sheets

IDENTIFYING PROBLEMATIC PRINTERS BY APPLYING MARKOV CHAIN MODEL

BACKGROUND

Unless otherwise indicated herein, the description in this background section is not prior art to the claims in this application and is not admitted to be prior art by inclusion in this section. The present disclosure relates to methods and systems for identifying problematic printers by applying a Markov chain model.

Printing devices have increased in both number and complexity as a result of added functions, applications, and services that can be provided. As a result, the number and types of errors that occur on printing devices have increased as well. Improving and/or simplifying the ability to identify problematic printers can lead to faster repairs and maintenance, and can lead to higher customer satisfaction and better business results.

SUMMARY

In a first aspect, an example method is provided. The method preferably includes determining a time interval for a printing device. The method also includes determining a number of pages printed by the printing device during the time interval. The method further includes determining a number of printing-device errors that occur on the printing device during the time interval. The method still further includes determining one or more coefficients of a Markov chain based on the number of pages printed by the printing device during the time interval and the number of printing-device errors that occur on the printing device during the time interval. The method yet further includes, based on the determined coefficients of the Markov chain, determining an operational status of the printing device.

In a second aspect, an example non-transitory computer readable medium is provided. The non-transitory computer readable medium has stored thereon instructions that, when executed by a processor, cause performance of a set of acts including determining a time interval for a printing device. The set of acts also includes determining a number of pages printed by the printing device during the time interval. The set of acts further includes determining a number of printing-device errors that occur on the printing device during the time interval. The set of acts still further includes determining one or more coefficients of a Markov chain based on the number of pages printed by the printing device during the time interval and the number of printing-device errors that occur on the printing device during the time interval. The set of acts yet further includes, based on the determined coefficients of the Markov chain, determining an operational status of the printing device.

In a third aspect, a system is provided. The system preferably includes one or more processors. The system also includes a memory storage that has instructions stored thereon that, when executed by the one or more processors, cause the system to perform a set of acts. The set of acts includes determining a time interval for a printing device. The set of acts also includes determining a number of pages printed by the printing device during the time interval. The set of acts further includes determining a number of printing-device errors that occur on the printing device during the time interval. The set of acts still further includes determining one or more coefficients of a Markov chain based on the number of pages printed by the printing device during the time interval and the number of printing-device errors that occur on the printing device during the time interval. The set of acts yet further includes, based on the determined coefficients of the Markov chain, determining an operational status of the printing device.

These, as well as other aspects, alternatives, and advantages, will become apparent to those of ordinary skill in the art by reading the following detailed description, with reference where appropriate to the accompanying drawings.

DETAILED DESCRIPTION

Figure 1:
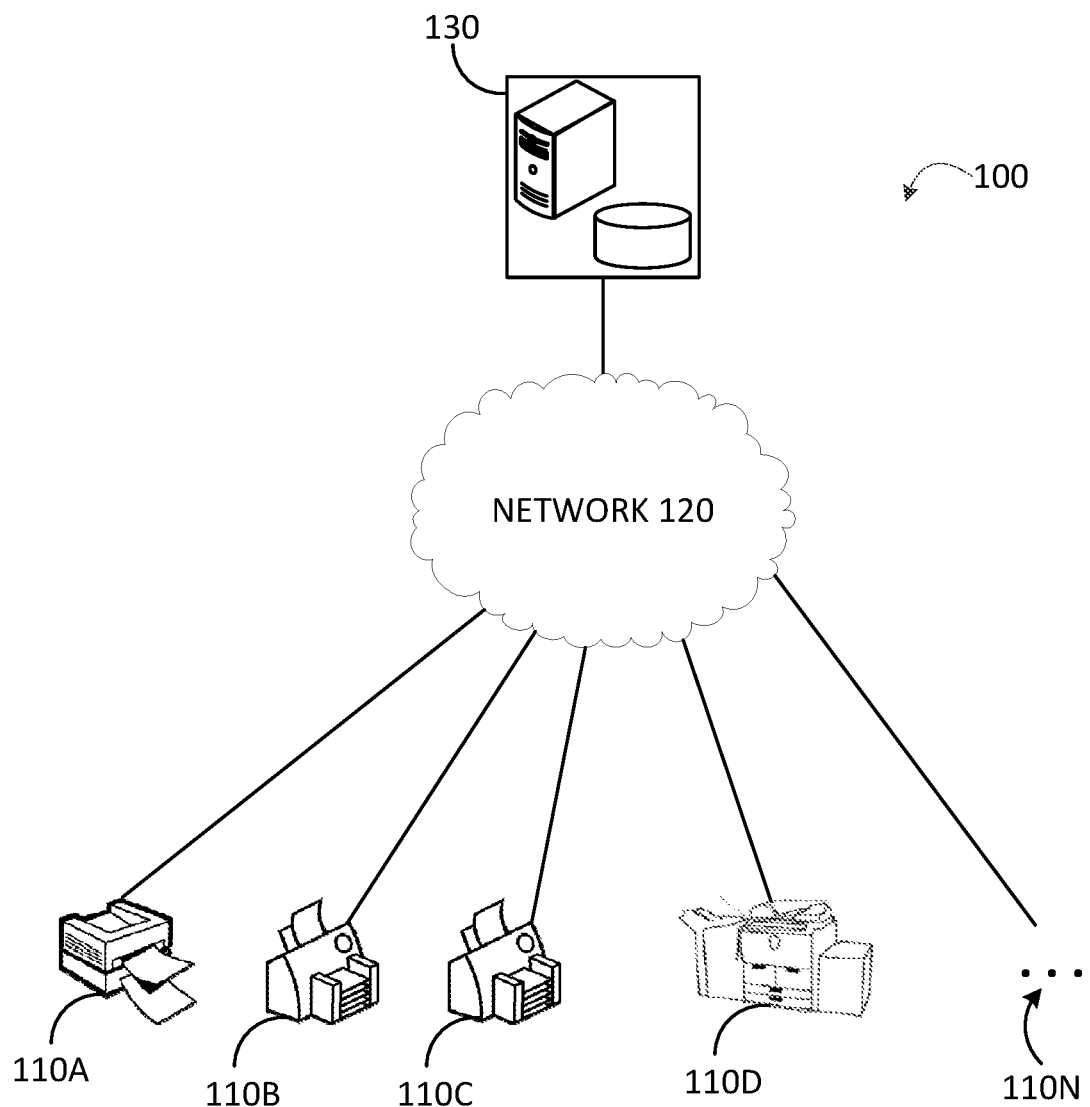
FIG. 1 is a block diagram illustrating an example system according to an embodiment of the present disclosure.

In the following detailed description, reference is made to the accompanying figures, which form a part hereof. In the figures, similar symbols typically identify similar components, unless context dictates otherwise. The illustrative embodiments described in the detailed description, figures, and claims, are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Various functions described herein as being performed by one or more entities may be carried out by hardware, firmware, or software logic. For instance, various functions described herein may be carried out be a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. Overview

Many organizations rely on properly functioning printing devices to operate effectively. Schools, offices, courtrooms, hospitals, and other types of organizations may use one or more printers in order to print forms, contracts, and/or other documents needed for the organization to run. In the event an error occurs on a printing device, it may take time and/or resources to fix the error and return the printing device to a healthy state, which may adversely affect the organization. Some errors, such as an empty ink cartridge or paper tray, may be relatively simple to fix. Other errors, such as a programming error or problem with an internal component of the printing device, may be more difficult to fix. Further, some errors may be intermittent, not immediately apparent, and/or may not be easily diagnosed and fixed.

One of the most important metrics for a printing device is a ratio of the number of printed pages per error. For example, a printing device that has printed 10,000 pages in thirty days, while having a total of 50 errors occur during the same duration, would have a ratio of:

$$R = \frac{10,000 \text{ pages}}{50 \text{ errors}} = 200 \text{ pages per error.}$$

This ratio on its own, however, only provides the average number of pages printed per error for a given time interval, and does not include whether the errors happened every day, whether there were 50 errors on one day, or some other distribution of errors. It also does not specify the type of errors that occurred.

One purpose of the present disclosure is to provide methods and systems for identifying problematic printers. This may be done by determining an operational status of a printing device using a Markov chain, and filtering out printers that may seem problematic based on limited information about their performance, but in reality are relatively healthy. In some cases, the operational status may be used to determine whether maintenance personnel should be dispatched to the printing device, whether a printing device may be fixed remotely, or whether some other action should be taken.

First, a time interval is determined for a printing device. The time interval may define a duration for which the printing device is in a discrete state of a Markov chain. At the end of each time interval, the printing device may remain in its current discrete state, or may transition to another discrete state of the Markov chain. For a given printing device, the time interval may be determined based on a context in which the printing device is used, and may correspond to a frequency with which a printing device is used and the need for reliable printing in the context. For instance, a time interval of twenty-four hours may be determined for a printing device used in an office setting. On the other hand, where the context is a courtroom, a time interval of four hours may be determined, because a courtroom may have a more frequent use and higher need for reliable printing than an office, for example. Many other time intervals and factors used to determine a time interval are possible as well.

Next, a number of pages printed by the printing device during the time interval may be determined. The number of pages printed may be determined based on a counter that increases each time a page is printed, for example.

Further, a number of printing-device errors that occur on the printing device during the time interval may be determined. In some examples, a printing device may keep track of printing-device errors by increasing a counter each time an error occurs. In other examples, each printing-device error may have an associated code or identifier which may allow the errors to be differentiated from each other.

An example method may then include determining one or more coefficients of a Markov chain based on the number of pages printed by the printing device during the time interval and the number of printing-device errors that occur on the printing device during the time interval. A Markov chain of the present disclosure may include two states, such as a healthy state and an unhealthy state. The determined coefficients may include the transition probabilities associated with the probability of transitioning from one state to another.

Then, based on the determined coefficients of the Markov chain, the example method may include determining an operational status of the printing device. Determining the operational status may include comparing the determined coefficients to previous coefficients of the same printing device and/or coefficients corresponding to other printing devices. Example operational statuses may include a healthy status, an unhealthy status, or an unknown status. Other operational statuses are possible as well.

II. Example Systems and Printing Devices

FIG. 1 is a block diagram illustrating an example system 100 according to an example embodiment of the present disclosure. System 100 may include one or more printing devices 110A-110N, and a server 130, which may be connected via a network 120. In some examples, system 100 may include more or fewer printing devices than are shown in FIG. 1, may include additional servers and/or computing devices, and/or may include one or more other systems or devices in addition to or instead of those shown in FIG. 1.

Printing devices 110A-110N may include one or more multi-function printing devices and/or stand-alone printing devices. A given printing device may be configured to perform one or more functions such as printing, scanning, emailing, storing, modifying, receiving, or transmitting one or more documents and/or files. In some examples, printing devices 110A-110N may include one or more computing devices such as computing device 200, or one or more components or aspects of computing device 200 described in more detail with respect to FIG. 2. In some examples, one or more of the printing devices 110A-110N may be connected to one or more personal computers, laptops, servers, handheld devices, and/or other computing devices and systems, which may be used in connection with the printing device to perform one or more actions, such as those described above.

Each printing device 110A-110N may be configured to perform one or more steps, actions, or functions described herein. For example, printing device 110A may communicate with server 130, to transmit and/or receive data or information via network 120 including time intervals, numbers of printed pages, numbers of errors, and other related information.

Server 130 may include a cloud based server, for example, that can perform one or more tasks to manage and/or maintain printing devices 110A-110N. Server 130 may communicate with printing devices 110A-110N to transmit or receive data. For instance, in some examples server 130 may transmit a command to the one or more printing devices 110A-110N to reset, install updates, or perform one or more printing or maintenance functions or operations. In other examples, server 130 may receive data from the one or more printing devices 110A-110N, such as a page count (i.e., number of pages printed), an error count, one or more error messages, or data corresponding to a page count, error count, and/or error message.

In some examples, server 130 may be configured to perform one or more functions or steps of the example methods and systems disclosed herein. For instance, server 130 may determine a time interval, number of pages printed, and number of printing-device errors for one or more printing devices. Server 130 may also determine a ratio of printed pages per printing-device error for one or more printing devices over a given time interval. Further, server 130 may determine one or more Markov chain coefficients based on the time interval, number of pages printed, number of printing-device errors, and/or determined ratio. Server 130 may then determine an operational status of one or more printing devices, and take one or more actions based on the determined operational status.

Server 130 may include one or more computing devices or systems (not shown), and may be consolidated in a single physical location, or distributed across two or more physical locations. Server 130 may include hardware, software, and/or firmware configured to carry out one or more functions or acts described herein.

Network 120 in the system 100 may include one or more wired or wireless connections that support communication between the devices of system 100. In some examples, network 120 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 120 may be configured to allow communication between server 130 and one or more printing devices 110A-110N, between the printing devices 110A-110N themselves, and/or between one or more other devices or systems and the system 100. Such communications may include commands, requests, and/or data corresponding to documents, printing-device errors, and/or other data.

Figure 2:
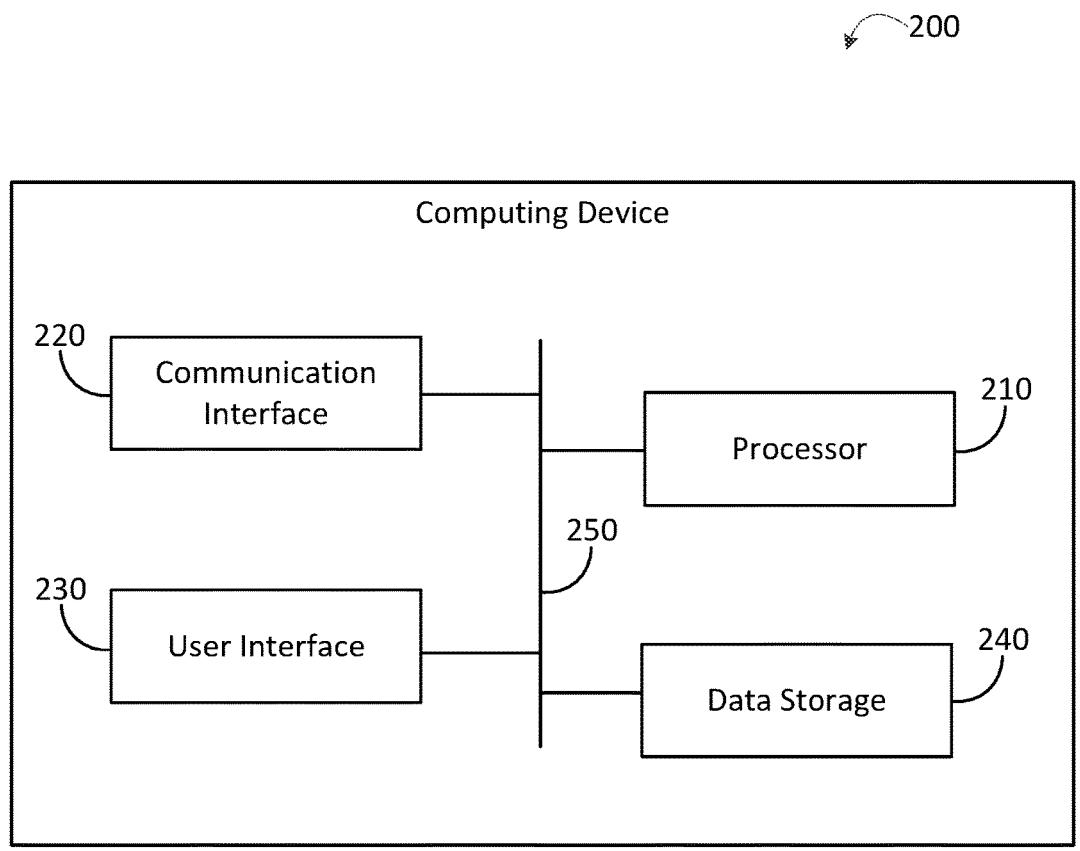
FIG. 2 is a block diagram illustrating an example computing device according to an embodiment of the present disclosure.

FIG. 2 is a block diagram illustrating an example computing device 200 according to an embodiment of the present disclosure. In some embodiments, computing device 200 may be configured for performing a variety of functions or acts, such as those described in this disclosure with respect to printing devices 110A-110N and server 130 of system 100, and with respect to one or more methods and systems described herein.

Computing device 200 may include one or more components, including for example, one or more processors 210, communication interfaces 220, user interfaces 230, and data storages 240. The components of computing device 200 may be communicatively connected to each other (or other devices or systems) via a system bus, network, or other link 250.

Processor 210 in computing device 200 may include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processor 210 may be configured to execute computer-readable program instructions contained in data storage 240, and/or other instructions as described herein.

Communication interface 220 in computing device 200 may be configured to allow computing device 200 to communicate with one or more devices (or systems) according to one or more protocols. In one example, communication interface 220 may be a wired interface, such as an Ethernet interface or a USB interface. As another example, communication interface 220 may be a wireless interface, such as a cellular or Wi-Fi interface, for example. Other example communication interfaces may include an Ethernet connection, Universal Serial Bus (USB) connection, fiber-optic link, coaxial cable, Bluetooth, ZigBee, WiMAX, wireless wide-area network (WWAN), and/or other similar type of interface.

Communication interface 220 of computing device 200 may allow one or more commands, requests, and/or data to be transmitted between the computing device and one or more other computing devices or systems, such as between one of printing devices 110A-110N and server 130 in system 100.

User interface 230 in computing device 200 may facilitate interaction with a user of the computing device, if applicable. As such, user interface 230 may include input components such as a keyboard, keypad, computer mouse, trackball, joystick, camera, microphone, voice recognition module, and touch sensitive panel, and output components such as a display screen (which, for example, may be combined with a touch sensitive panel), sound speaker, and haptic feedback system.

Data storage 240 in computing device 200 may include one or more volatile, non-volatile, removable, and/or non-removable storage components, such as magnetic, optical, or flash storage, and may be integrated in whole or in part with processor 210. Data storage 240 may store machine-readable instructions that, when executed by processor 210, cause performance of a set of acts or functions such as those described herein with respect to the devices, systems, methods, features, and embodiments. Such program instructions may define or be part of a discrete software application that can be executed in response to certain inputs received from user interface 230, for instance. Data storage 240 may also store other types of information or data, such as those types described throughout this disclosure (e.g., time interval, number of pages printed, number of printing-device errors, error types or error codes, and/or other data).

III. Example Error Distributions

Figure 3A:
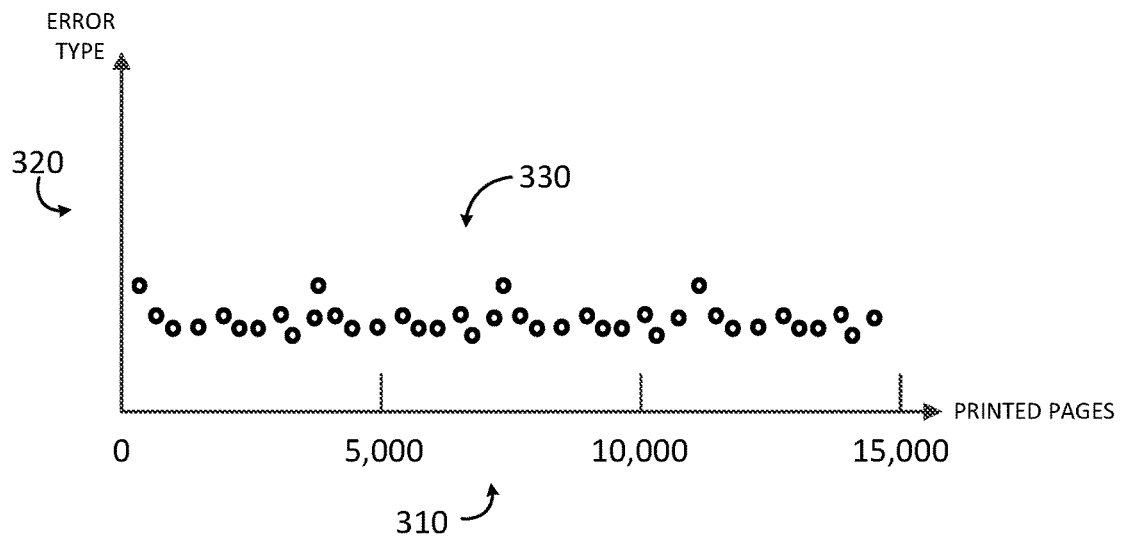
FIG. 3A is a diagram illustrating an example distribution of printing-device errors.
Figure 3B:
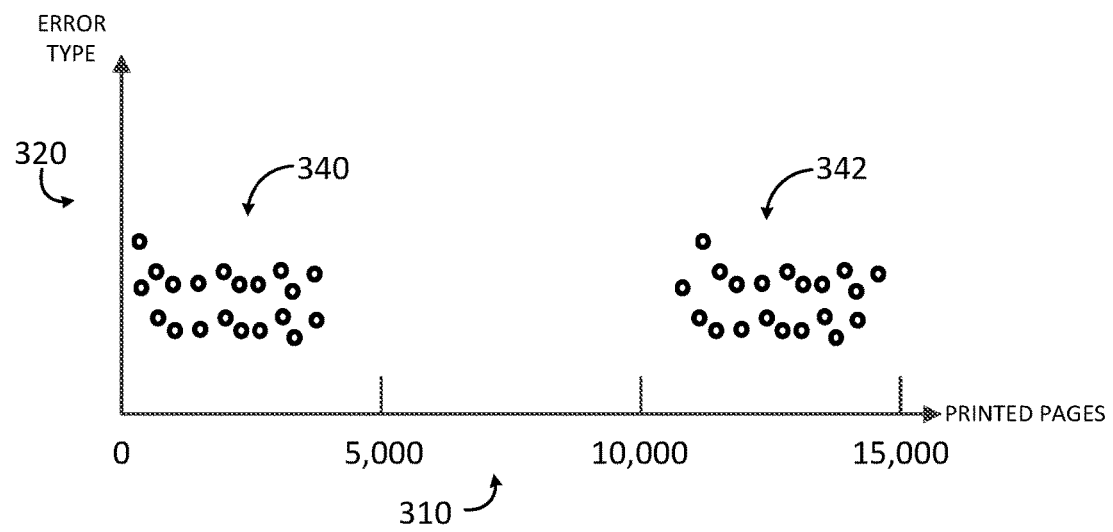
FIG. 3B is a diagram illustrating an example distribution of printing-device errors.

FIGS. 3A and 3B show diagrams illustrating example distributions of printing-device errors according to embodiments of the present disclosure. FIG. 3A shows a diagram corresponding to a printing device which has errors spread evenly over a given number of printed pages. Axis 310 corresponds to a number of printed pages and axis 320 corresponds to the type of error, while each mark 330 corresponds to an error. The types of errors that are distributed evenly may be systemic errors, errors that occur due to the age of the printing device, or other types of errors that are difficult to easily diagnose and fix. For example, a programming bug may cause an attempt to print certain types of documents to cause a printing-device error, which may not be easily noticeable. Further, as the printing device ages, one or more components may lose their ability to function properly, which may lead to errors occurring. On the other hand, FIG. 3B shows a diagram corresponding to a printing device which has errors concentrated over two shorter amounts of printed pages. Axis 310 again corresponds to a number of printed pages and axis 320 corresponds to the type of error, while each mark 330 corresponds to an error. In general, errors that occur in rapid succession and are fixed quickly are the types of errors that are easily fixed, such as a paper jam or empty paper tray. While both FIGS. 3A and 3B show the same number of errors over the same number of printed pages (40/15,000), the operational status of the printing devices may be different, where one is unhealthy and one is healthy for example.

In FIG. 3A, the horizontal axis 310 may represent the number of pages printed by a given printing device over time, such as one of printing device 110A-110N. The vertical axis 320 may represent the type of error that occurred on the printing device. Each mark 330 may represent a printing-device error that occurred on the printing device. In the example shown in FIG. 3A, the corresponding printing device has printed 15,000 pages, and has had 40 errors occur. The errors were generally evenly spaced throughout the 15,000 printed pages. The ratio of pages printed per error in FIG. 3A is:

$$R(3A) = \frac{15{,}000 \text{ pages}}{40 \text{ errors}} = 375 \text{ pages per error.}$$

In FIG. 3B, the horizontal axis 310 and vertical axis 320 represent the number of pages printed and type of error that occurred on a given printing device respectively, similar to FIG. 3A. FIG. 3B differs from FIG. 3A, however, in that the distribution of errors is more concentrated over the number of printed pages. For instance, FIG. 3B shows that there were 40 errors in total, with 20 errors having occurred between the printing of page 0 and page 5000, while 20 occurred between the printing of page 10,000 and page 15,000. However, the ratio of printed pages per error for the printing device corresponding to FIG. 3B is:

$$R(3B) = \frac{15{,}000 \text{ pages}}{40 \text{ errors}} = 375 \text{ pages per error.}$$

Even though the distribution of errors is different for the printing devices corresponding to the diagrams in FIGS. 3A and 3B, the ratio of errors is the same. As such, it is difficult to differentiate printing devices based on the ratio alone.

Figure 4A:
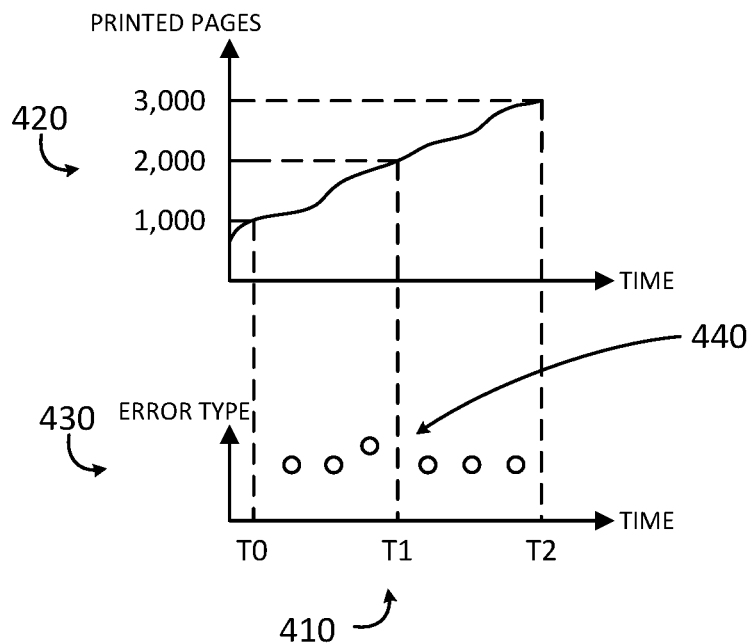
FIG. 4A is a diagram illustrating an example distribution of pages printed and printing-device errors over time.
Figure 4B:
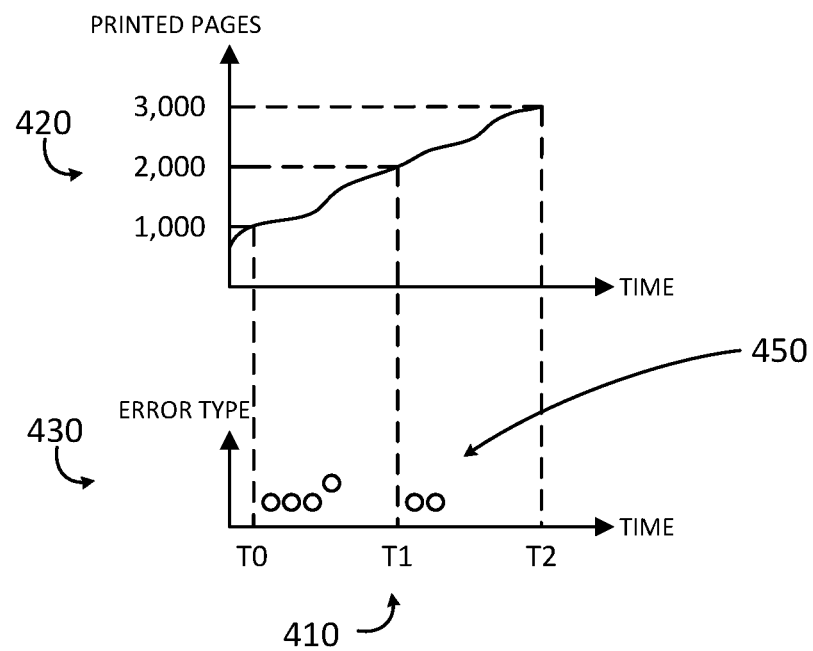
FIG. 4B is a diagram illustrating an example distribution of pages printed and printing-device errors over time.

FIGS. 4A and 4B show diagrams illustrating example distributions of printing-device errors according to embodiments of the present disclosure. FIG. 4A shows a diagram corresponding to a printing device which has errors spread evenly over a given duration of time. The printing device corresponding to FIG. 4A may be similar or identical in some respects to the device corresponding to FIG. 3A. For instance, the errors may be evenly distributed over time, as shown in FIG. 4A. The printing device corresponding to FIG. 4B may be similar or identical in some respects to the printing device corresponding to FIG. 3B. For instance, the errors may be concentrated over a shorter duration of time or fewer number of printed pages. While both figures show the same amount of errors over the same number of printed pages, the status of the printing devices may be different, where one is unhealthy and one is healthy for example.

In FIG. 4A, the horizontal axis 410 may be a time axis, where T0 is a first point in time, T1 is a second point in time, and T2 is a third point in time. Vertical axis 420 may represent the number of pages printed by a corresponding printing device, or a value of a counter of the printing device. Vertical axis 430 may represent the types of printing-device errors that occur on the corresponding printing device, such as a paper jam, network error, or others. Each mark 440 may represent a printing-device error. In the example shown in FIG. 4A, between T0 and T2, the corresponding printing device printed 2,000 pages and had six errors occur. The errors were generally evenly spaced between T0 and T2. The ratio of pages printed per error in FIG. 4A for the full time interval shown in FIG. 4A, (i.e., the time interval between T0 and T2) is:

$$R(4A, T0 - T2) = \frac{2{,}000 \text{ pages}}{6 \text{ errors}} = \sim 333 \text{ pages per error.}$$

The ratios of printed pages per error for the time intervals of T0 to T1 and T1 to T2 respectively are:

$$R(4A, T0 - T1) = \frac{1{,}000 \text{ pages}}{3 \text{ errors}} = \sim 333 \text{ pages per error.}$$

$$R(4A, T1 - T2) = \frac{1{,}000 \text{ pages}}{3 \text{ errors}} = \sim 333 \text{ pages per error.}$$

In FIG. 4B, the horizontal axis 410 and vertical axes 420 and 430 may represent time, the number of pages printed (or a counter value), and type of printing-device errors respectively for a given printing device, similar to the axes of FIG. 4A. FIG. 4B differs from FIG. 4A, however, in that the distribution of errors 450 is more concentrated over time. For instance, FIG. 4B shows that there were 6 errors total, with four errors occurring between T0 and T1 and 2 errors occurring between T1 and T2. The ratio of printed pages per error in FIG. 4B, for the full time interval between T0 and T2 is:

$$R(4B, T0 - T2) = \frac{2{,}000 \text{ pages}}{6 \text{ errors}} = \sim 333 \text{ pages per error.}$$

The ratios of printed pages per error for the time intervals of T0 to T1 and T1 to T2 respectively are:

$$R(4B, T0 - T1) = \frac{1{,}000 \text{ pages}}{4 \text{ errors}} = 250 \text{ pages per error.}$$

$$R(4B, T1 - T2) = \frac{1{,}000 \text{ pages}}{2 \text{ errors}} = 500 \text{ pages per error.}$$

As can be seen from the ratios corresponding to FIGS. 4A and 4B, the selection of time intervals (T0, T1, and T2) has a noticeable impact on the calculated ratios. These ratios may be used in part to determine coefficients of one or more Markov chains, which may then be used to determine an operational status of a printing device.

Figure 4C:
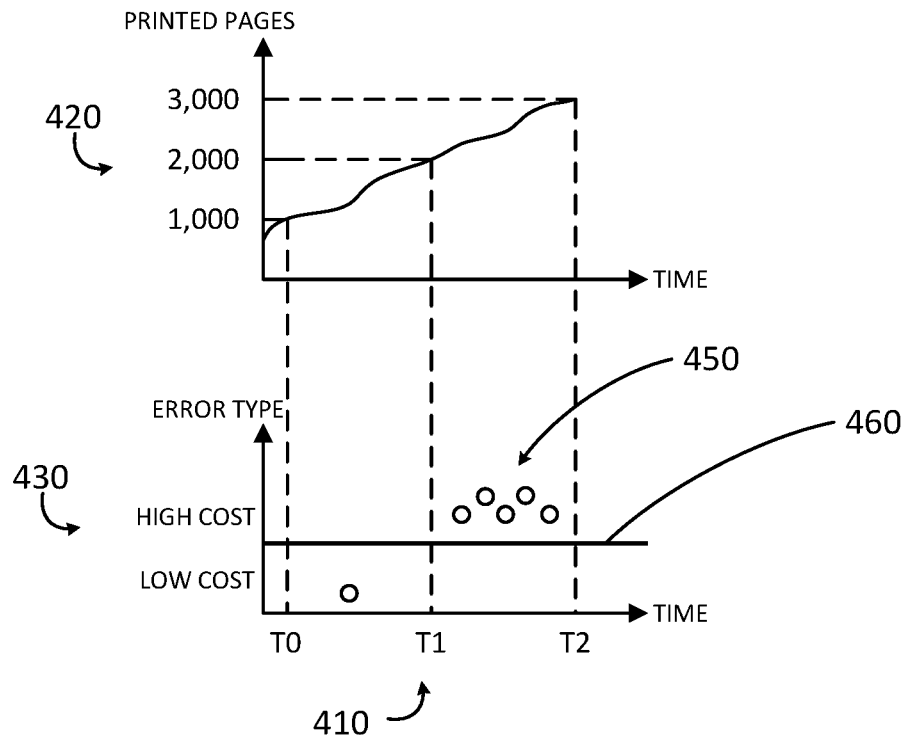
FIG. 4C is a diagram illustrating an example distribution of pages printed and printing-device errors over time.

FIG. 4C shows a diagram illustrating an example distribution of printing-device errors according to an embodiment of the present disclosure. In the embodiment shown in FIG. 4C, the state of the printing device is determined based on (i) the type of errors that occur during a time interval and (ii) the number of errors that occur during the same time interval. Axis 410 corresponds to the time, axis 420 corresponds to the number of printed pages, and axis 430 corresponds to the type of errors that occur. Each mark 450 corresponds to an error. In this example, errors may be categorized as "low cost" errors (i.e., errors that cause a short down time of the printing device, such as low toner), and "high cost" errors (i.e., errors that require a long down time of the printing device, such as a system error). Other categories are possible as well, such as "medium cost" or others. Line 460 in FIG. 4C illustrates a line distinguishing between high cost and low cost errors. In examples that include "low cost," "high cost," and "medium cost" errors (and/or other categories), there may be two (or more) lines separating the respective categories.

In the example shown in FIG. 4C, there is a threshold value for the number of errors that occur during a time interval. Here, the threshold may be set at four errors. In other examples, there may be multiple thresholds, such as four errors, fifty errors, and one hundred errors, such that the number of errors that occur may fall into a single category that is either zero-to-four errors, five-to-fifty errors, fifty-to-one hundred errors, or greater than one hundred errors. Other values are possible as well.

In FIG. 4C, the example printing device has printed 2,000 pages between T0 and T2. Between T0 and T1, one low cost error occurred. Between T1 and T2, 5 high cost errors occurred. Using a threshold number of errors set at four errors, between T0 and T1, the printing device was "below threshold" and "low cost," and between T1 and T2, the printing device was "above threshold" and "high cost."

Figure 4D:
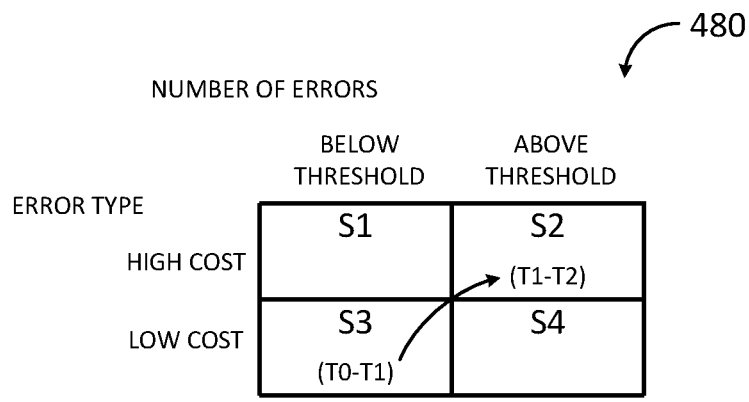
FIG. 4D is a diagram illustrating example states according to an example embodiment of the present disclosure.

FIG. 4D is a diagram 480 showing the possible states for the example printing device having an error distribution according to FIG. 4C. State 1 (S1) is a state in which fewer than the threshold number of "high cost" errors (e.g., four or less) occur during a time interval. State 2 (S2) is a state in which greater than the threshold number of "high cost" errors occur during a time interval. State 3 (S3) is a state in which fewer than the threshold number of "low cost" errors occur during a time interval. And state 4 (S4) is a state in which greater than the threshold number of "low cost" errors occur during a time interval.

For the example shown in FIGS. 4C and 4D, the printing device is in state S3 for the first time interval, because only one low cost error occurred. The printing device then transitions to state S2 for the second time interval, because five high cost errors occurred. Put another way, the state of the printing device in this example is determined based on both the number and type of errors that occur during each time interval. At the end of each interval, the printing device may or may not transition to a different state, depending on the number and type of errors that occurred during the previous time interval.

IV. Example Markov Chains

A Markov chain describes a process that undergoes transitions from one state to another on a state space. The one or more states may correspond to states of a system or device, such as system 100 or one or more of printing devices 110A-110N. Each Markov chain may have one or more associated coefficients, which are used to determine a probability of transitioning between states or remaining in a given state of the chain. For instance, a two-state Markov chain, such as the one shown in FIG. 5, may have a probability of transitioning from a first state to a second state, from the second state to the first state, and a probability of remaining in each state, for a total of four coefficients or transition probabilities.

Figure 5:
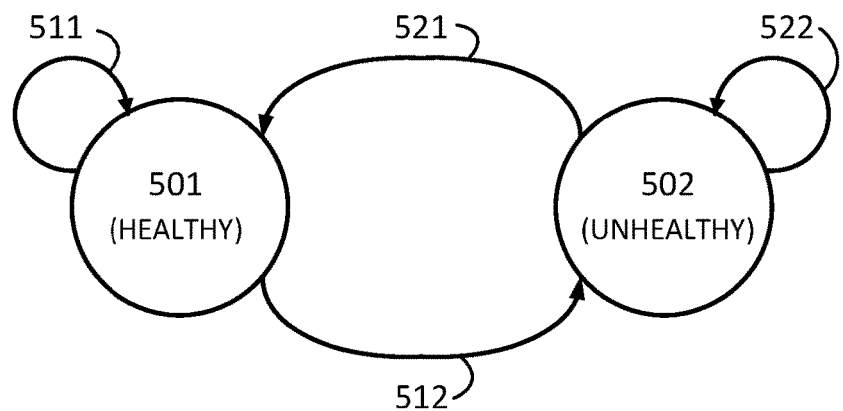
FIG. 5 is a block diagram illustrating an example Markov chain according to an embodiment of the present disclosure.

FIG. 5 is a block diagram illustrating an example Markov chain according to an embodiment of the present disclosure. The Markov chain in FIG. 5 is a two-state Markov chain including a healthy state 501 and an unhealthy state 502, which correspond to possible states of a printing device, such as one of printing devices 110A-110N. Each state may be defined by one or more variables. For example, healthy state 501 and unhealthy state 502 may be defined as:

State 501(Healthy)=R>F1
State 502(Unhealthy)=R<F2 where R is the ratio of the number of pages printed per printing-device error over a given time interval, and F1 and F2 are threshold values. The threshold values may be set in advance, or may be dynamically changed based on data received from one or more devices or systems.

In one particular example, threshold value F1 may be 2000 pages per error, and threshold F2 may be 100 pages per error for a given Markov chain. For each time interval, a ratio is determined. Suppose that a given printing device, such as printing device 110A, is in healthy state 501 at a first time T0. At time T1 after a determined time interval has elapsed, a ratio of printed pages per error is determined (i.e., R(T0-T1)). If the determined ratio is less than 100 pages per error (i.e., R<F2), then the printing device transitions to unhealthy state 502. However, if the ratio is greater than or equal to 100, the printing device remains in healthy state 501.

Now suppose that printing device 110A is in unhealthy state 502 at time T1. At time T2 after a determined time interval has elapsed, the ratio of printed pages per error is again determined (i.e., R(T1-T2)). If the determined ratio is greater than 2000 pages per error (i.e., R>F1), the printing device may transition back to healthy state 501. However, if the ratio is less than or equal to 2000 pages per error, the printing device may remain in unhealthy state 502.

FIG. 5 includes transition paths 511, 512, 521, and 522, corresponding to the probability of remaining in state 501 (511), transitioning from state 501 to state 502 (512), transitioning from state 502 to state 501 (521), and remaining in state 502 (522). Each of these probabilities may correspond to, include, or be based on one or more coefficients, which in turn may be determined in part by one or more threshold values determined for a given printing device.

Figure 6:
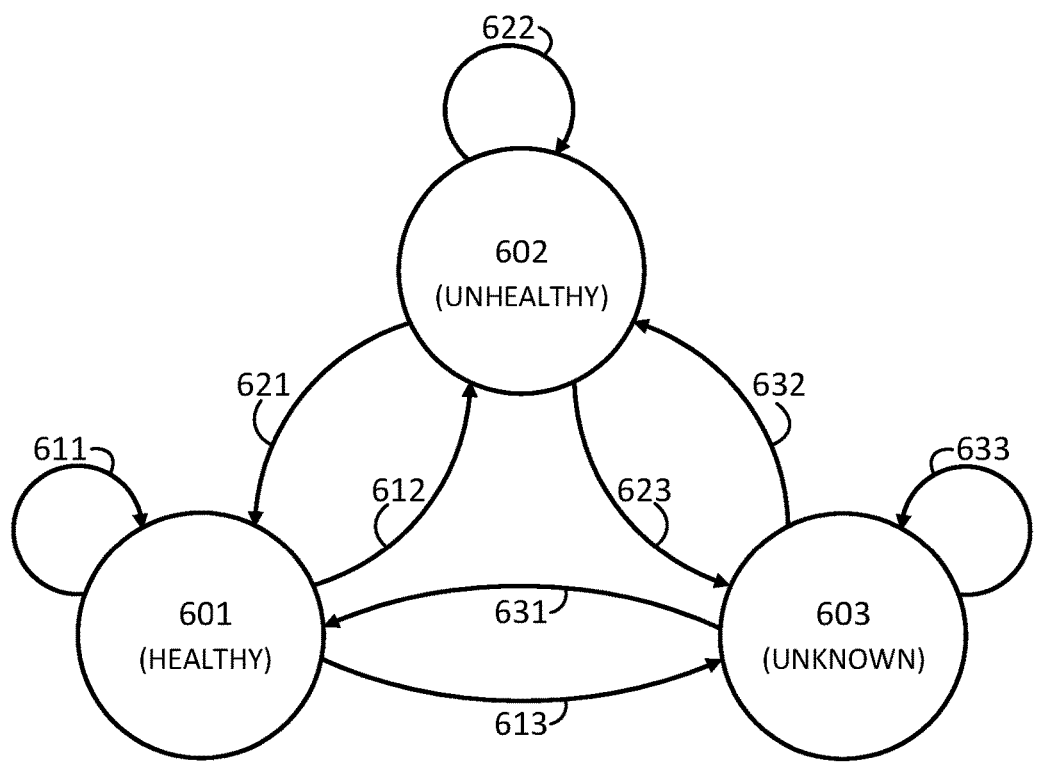
FIG. 6 is a block diagram illustrating an example Markov chain according to an embodiment of the present disclosure.

FIG. 6 shows a block diagram illustrating another example Markov chain according to an embodiment of the present disclosure. FIG. 6 shows a three-state Markov chain, where the states are a healthy state 601, an unhealthy state 602, and an unknown state 603. Unknown state 603 may correspond to a state of a printing device that is not in use or has a very low usage (e.g., a small number of printed pages or small duration of time in use). The Markov chain may also have transition paths 611, 612, 613, 621, 622, 623, 631, 632, and 633, which correspond to the probability of a printing device remaining in a given state, or transitioning to a different state, from one time interval to the next. The transition paths in FIG. 6 may correspond to the probability of remaining in healthy state 601 (611), transitioning from healthy state 601 to unhealthy state 602 (612), transitioning from healthy state 601 to unknown state 603 (613), transitioning from unhealthy state 602 to healthy state 601 (621), remaining in unhealthy state 602 (622), transitioning from unhealthy state 602 to unknown state 603 (623), transitioning from unknown state 603 to healthy state 601 (631), transitioning from unknown state 603 to unhealthy state 602 (632), and remaining in unknown state 603 (633).

In one example, states 601, 602, and 603 may be defined as

State 601(Healthy)=R>F1
State 602(Unhealthy)=R<F2
State 603(Unknown)=PP<1000 where R is the ratio of the number of pages printed per printing-device error over a given time interval, F1 and F2 are threshold values, and PP is the number of pages printed during a given time interval.

Following the example as described with respect to FIG. 5, threshold value F1 may be 2000 pages per error and threshold F2 may be 100 pages per error for a given Markov chain. In addition, the printed pages (PP) value may be 1000 pages. For each time interval, a ratio (R) is determined. Suppose that printing device 110A is in healthy state 601 at a first time T0. At time T1 after a determined time interval has elapsed, a ratio of printed pages per error is determined (i.e., R(T0–T1)). If the determined ratio is less than 100 pages per error (i.e., R<F2), then printing device 110A transitions to unhealthy state 602. However, if the ratio is greater than or equal to 100, printing device 110A remains in healthy state 601.

Now suppose that printing device 110A is in unhealthy state 602 at time T1. At time T2 after a determined time interval has elapsed, the ratio of printed pages per error is again determined (i.e., R(T1–T2)). If the determined ratio is greater than 2000 pages per error (i.e., R>F1), printing device 110A may transition back to healthy state 601. However, if the ratio is less than or equal to 2000 pages per error, printing device 110A may remain in unhealthy state 602.

Suppose further, that printing device 110A is in either healthy state 601 or unhealthy state 602 at time T2. At time T3 after a determined time interval has elapsed, the ratio of printed pages per error is again determined. (As described above, determining the ratio includes determining the number of pages printed and dividing by the number of printing-device errors.) If the number of pages printed during the time interval from T2-T3 is less than 1000 pages, printing device 110A will transition to unknown state 603. In some examples, the number of pages printed is prioritized over a determined ratio. For instance, where printing device 110A has printed 50 pages during a time interval and has had 5 errors occur (i.e., R=10 and PP=50), printing device 110A may have conflicting instructions to (i) transition to unhealthy state 602 (because R<100), and (ii) transition to unknown state 603 (because PP<1000). The number of pages printed may be prioritized, such that in this example printing device 110A transitions to or remains in unknown state 603. It should be noted that the thresholds, values, and priorities in these examples are for illustrative purposes only, and may be set and modified based on a desired implementation.

While FIGS. 5 and 6 are shown with states corresponding to healthy, unhealthy, and unknown, it should be noted that other states are possible as well. For example, various states may be determined based on the number and type of errors that occur (i.e., high cost and below threshold, high cost and above threshold, etc.) as described with respect to figured 4C and 4D above.

V. Example Methods

Figure 7:
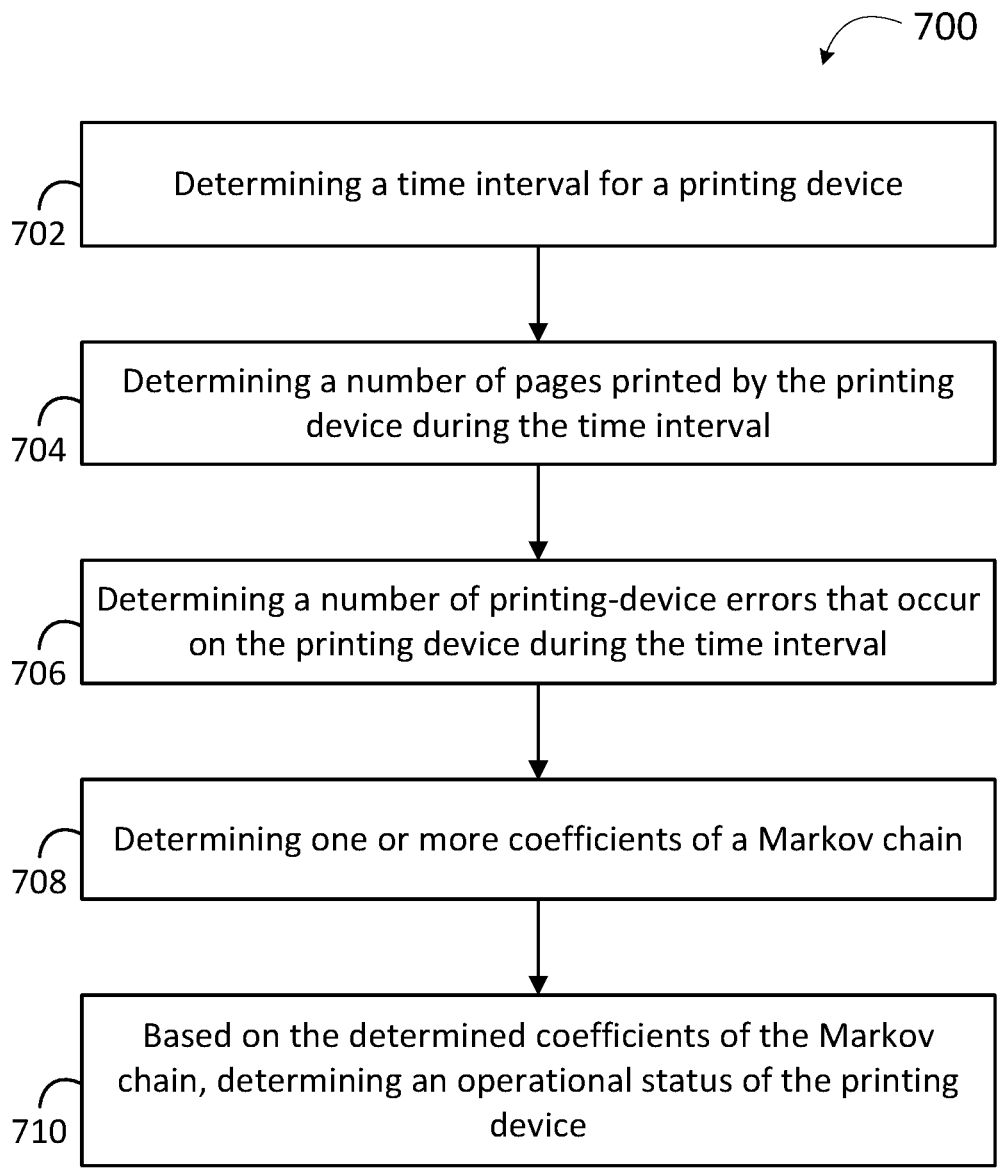
FIG. 7 is a flow chart illustrating an example method according to an embodiment of the present disclosure.

FIG. 7 is a flow chart illustrating an example method 700 according to an embodiment of the present disclosure. Although FIG. 7 illustrates method 700 as including certain blocks in a particular order, it should be understood that blocks may be added, subtracted, and/or carried out in a different order while remaining within the scope of this disclosure. Furthermore, some or all of the blocks of method 700 may be carried out by system 100 and/or the various components of system 100, including printing devices 110A-110N, for example.

Method 700 may include blocks 702-710. At block 702, method 700 may involve determining a time interval for a printing device. The printing device may be one of printing devices 110A-110N in FIG. 1, for example. The time interval may be any duration of time over which data corresponding to the printing device can be gathered. For instance, the time interval may be twenty-four hours, one week, or longer, or may be as short as an hour or less, depending on the frequency and type of use, as well as other factors. The time interval may be determined such that it allows the printing device time to print a sufficient number of pages. For instance, for a printing device that is used often and prints a substantial amount of pages during normal operation, a shorter time interval may be determined. However, for a printing device that is not used very often, for example a few times a day, a longer time interval may be determined, such as a week or longer.

In some examples, the time interval for a given printing device may be determined based on a context in which the printing device operates. The context may be a business, office, shop, hospital, school, courtroom, law office, home, or any other context in which a printing device operates. The context may have one of more associated factors used to determine the time interval for the context, such as how often the printing device is used in the context, the usual type of document printed, the type of use of the printing device (scanning, emailing, copying, printing, etc. . . . ), the likelihood that the printing device will have an error occur during a given time interval, the importance of having a functioning printing device in the context, or other factors.

In some examples, the time interval for a printing device may be determined by the printing device itself, by a server connected to the printing device, or by another device or system connected to the printing device and/or server. After the time interval is determined, in some cases the time interval may be transmitted from the server to the printing device, or vice versa, or from another device or system to the printing device and/or server. As a result, the time interval may be determined by one device in the system, and may be used by another device in the system to perform one or more functions or acts described herein.

In some examples, the time interval for a printing device may be determined independently from one or more other printing devices. For instance, each printing device 110A-110N in system 100 may have a time interval determined independently from the other printing devices. The server 130 may determine a time interval for each printing device 110A-110N based on the context of each printing device, and/or other factors or information. Server 130 may receive, or have stored in a memory, information corresponding to each printing device 110A-110N. For example, server 130 may store information corresponding to the context in which each printing device 110A-110N is used, the type and age of each printing device, and/or statistical information on how each printing device is used. Server 130 may determine a time interval for each printing device based on the corresponding information. In that way, where two or more printing devices 110A-110N are connected to server 130, a different time interval may be determined for each printing device.

In other examples, the time interval for a printing device in a system including two or more printing devices may be determined based on data corresponding to one or more other printing devices. For instance, a system including two or more printing devices may determine a single time interval to be used for both printing devices, or may use data corresponding to one printing device to determine a time interval for the second device. In a system including many printing devices, data may be gathered corresponding to time intervals, pages printed, printing device errors, and operational statuses of the many printing devices, which may then be used to determine a time interval for a printing device in the system. For instance, a time interval for one printing device may be determined based on one or more time intervals determined for similar printing devices in the system, such as printing devices in a similar context, similar age, similar pages printed and errors occurred, similar types of errors, and/or one or more other characteristics.

At block 704, method 700 may involve determining a number of pages printed by the printing device during the time interval. In some examples, the printing device may include a counter that counts the number of pages printed by the printing device. The counter may increment by one each time a page is printed. In other examples, the printing device may associate a time stamp with each printed page or document. The printing device may determine a number of printed pages during the time interval based on the counter, the time stamp, and/or other information.

In some examples, the printing device may transmit data to a server, such as server 130 in system 100. The data may include a page count from the counter of the printing device, a number of pages printed during the time interval, or any other relevant information. In a particular example, at a time T0 printing device 110A may transmit a first counter value to server 130. At T1, after a time interval has elapsed, printing device 110A may transmit a second counter value to server 130. Server 130 may then subtract the first counter value from the second counter value to determine a number of pages printed between T0 and T1. In other examples, printing device 110A may perform a subtraction of the counter values, and then provide the result to server 130. Other examples are possible as well.

At block 706, method 700 may involve determining a number of printing-device errors that occur on the printing device during the time interval. The errors may include errors that are easily fixed, such as an empty paper tray or paper jam, as well as errors that are not easily fixed, such as communication errors, broken components, or other complex problems. Each error that occurs on the printing device may have a corresponding error code that may be used to identify the type of error, the time the error occurred, and other error details.

In some examples, the printing device may include a counter that increments for each error that occurs on the printing device. The printing device may then transmit the counter value to a server such as server 130 in system 100. In other examples, the printing device may transmit an error code to the server each time an error occurs. In still other examples, the printing device may store information corresponding to each error that occurs, and transmit the information to the server at a specified interval, such as once per day. In yet other examples, the printing device may store information corresponding to the number and/or type of error that occurred on the printing device, and may transmit that information to the server at the end of the time interval determined for the printing device.

At block 708, method 700 may involve determining one or more coefficients of a Markov chain. The Markov chain may be similar or identical to the Markov chains described above with respect to FIGS. 5 and 6. For instance, the Markov chain may include two or more states corresponding to an operational status of a printing device.

In some examples, the determined coefficients may be based on the number of pages printed by the printing device during the time interval and the number of printing device errors that occur on the printing device during the time interval. For instance, the coefficients of the Markov chain may be the probability of transitioning from one state to another, and may be determined based on the printed pages and/or errors for a given printing device. As described above with respect to FIG. 6, unknown state 603 may correspond to a printing device that has printed less than 1000 pages during a time interval. As such, the coefficients corresponding to transition paths 613 and 623 for a printing device transitioning from healthy state 601 or unhealthy state 602 to unknown state 603 may be determined based on the number of pages printed by the printing device, and not based on the number of errors that occurred on the printing device during the same time interval.

In some examples, the number of pages printed during a time interval may be divided by the number of printing-device errors that occur on the printing device during the time interval, resulting in a ratio of printed pages per error. The ratio may then be used to determine the coefficients (i.e., transition probabilities) of a Markov chain. For instance, as described above with respect to FIG. 6, healthy state 601 may correspond to a printing device that has a ratio lager than 2000 pages per error, and unhealthy state 602 may correspond to a printing device having a ratio less than 100 pages per error. The coefficients corresponding to a transition from one state into the healthy or unhealthy state (i.e., paths 612, 621, 632, and 632) may thus be determined based on the ratio determined for the printing device.

At block 710, method 700 may involve, based on the determined one or more coefficients of the Markov chain, determining an operational status of the printing device. Determining the operational status may include comparing the determined coefficients to previous coefficients of the same printing device. Current and previous coefficients may be stored, and a comparison between past coefficients and current coefficients may allow the printing device to be ranked and/or classified. The comparison may also allow the printing device, server, and/or another system or device to determine more precisely which errors or types of errors occur, and whether any components need to be replaced.

Determining the operational status may also include comparing the determined coefficients to coefficients of other printing devices. The comparison between printing devices may allow the printing devices to be ranked and/or compared to an average health level or threshold health level, and may allow easier determination of which device or devices require maintenance.

As discussed above, the operational status may be a healthy status, an unhealthy status, or an unknown status, for example. Other statuses may be possible as well such as a maintenance status, which may indicate a printing device currently undergoing maintenance, or another status, which may be a catch-all or default status.

In some examples, a server or other device or system connected to a printing device may classify the printing device as healthy, unhealthy, or unknown (or another status) based on the Markov chain, including the Markov chain coefficients. For instance, the server, device, or system may build the Markov chain using the time interval, number of printed pages during the time interval, and number of printing-device errors that occur during the time interval. The server, device, or other system may include software, or computer program instructions encoded on a computer-readable storage medium in a machine-readable format. The computer program instructions, when executed by a processor, may implement one or more actions such as receiving data from one or more devices or systems, building a Markov chain, and classifying printing devices based on the Markov chain, for example. The computer program instructions can implement one or more actions described in this disclosure by determining and/or carrying out one or more equations or formulas, comparing data from two or more printing devices, and/or performing other logical operations.

In some examples, the server, device, or system may determine the status of a printing device based on a most recent determined ratio, or based on one or more other factors. In other examples, the server may determine the status of a printing device based on an analysis of multiple printing devices and/or multiple Markov chains. The server may be a central server connected to a plurality of printing devices, and may use information received from one or more other printing devices to determine the operational status of a given printing device.

In still other examples, after or responsive to determining the operational status of a printing device, the server, device or system may transmit a message to the printing device indicating the status of the printing device. The server, device, or system may also transmit one or more commands, data, or information.

VI. Example Variations

In some embodiments, the printing device may be a first printing device of a plurality of printing devices. For instance, as shown in FIG. 1, system 100 includes a plurality of printing devices 110A-110N. The methods and operations described in this disclosure may be performed for the plurality of printing devices 110A-110N.

For example, where a system includes a plurality of printing devices 110A-110N, coefficients for a shared Markov chain may be determined based on the time intervals, pages printed, and printing device errors of all or a subset of the printing devices 110A-110N. Further, the operational status of each of the plurality of printing devices 110A-110N may be determined based on the coefficients of the shared Markov chain.

In other examples, coefficients for a plurality of Markov chains may be determined for a plurality of printing devices. For instance, each printing device 110A-110N of system 100 may have an associated Markov chain and coefficients, which may be used to determine the operational status of each printing device 110A-110N.

In still other examples, one or more coefficients of a Markov chain corresponding to a first printing device may be used to determine the coefficients of a second Markov chain corresponding to a second printing device.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the diagrams, examples, and flow charts in the figures and as discussed herein, each block and/or connection may represent a processing of information and/or a transmission of information in accordance with example embodiments. Alternative embodiments may be included within the scope of such example embodiments. Further, more or fewer blocks and/or functions may be used with any of the diagrams, examples, and flow charts discussed herein, and these diagrams, examples, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting with the true scope and spirit being indicated by the following claims.

What is claimed is:

1. A method comprising:
    determining a plurality of time intervals for a printing device including a first time interval and a second time interval;
    determining a first number of pages printed by the printing device during the first time interval and a second number of pages printed by the printing device during the second time interval, wherein the first and second number of pages printed are determined by a counter that is incrementally increased for each page printed by the printing device;
    determining a first number of printing-device errors that occur on the printing device during the first time interval and a second number of printing-device errors that occur on the printing device during the second time interval, wherein each printing-device error has a corresponding error type;
    calculating a first ratio of pages printed per error, based on the first number of pages and the first number of printing-device errors, and calculating a second ratio of pages printed per error, based on the second number of pages and the second number of printing-device errors;
    comparing the first ratio to one or more predetermined thresholds, and comparing the second ratio to the one or more predetermined thresholds;
    determining, based on the comparison of the first ratio with the one or more predetermined thresholds, a first operational state of the printing device during the first time interval, wherein the first operational state is one of two or more operational states;
    determining, based on the comparison of the second ratio with the one or more predetermined thresholds, a second operational state of the printing device during the second time interval, wherein the second operational state is different from the first operational state and is one of the two or more operational states;
    determining a matrix of transition coefficients of a Markov chain between the first operational state during the first time interval and the second operational state during the second time interval;
    based on the determined matrix of transition coefficients of the Markov chain between the first operational state during the first time interval and the second operational state during the second time interval, determining a current operational status of the printing device; and
    based on the current operational status, performing, by a server connected to the printing device, a maintenance action for the printing device.

2. The method of claim 1, wherein the first and second time intervals for the printing device are determined based on a context in which the printing device operates.

3. The method of claim 2, wherein the context comprises a business office, and wherein the time interval for the printing device is a business day.

4. The method of claim 1, further comprising:
    based on the determined current operational status of the printing device, classifying the printing device as either healthy, unhealthy, or unknown.

5. The method of claim 1, further comprising:
    based on the determined current operational status of the printing device, transmitting a message indicating the current operational status of the printing device.

6. The method of claim 1, wherein the printing device is a first printing device of a plurality of printing devices, and wherein determining the current operational status of the printing device based on the determined matrix of transition coefficients of the Markov chain between the first operational state during the first time interval and the second operational state during the second time interval further comprises:
    determining the current operational status of each of the plurality of printing devices based on the determined matrix of coefficients of the Markov chain between the first operational state during the first time interval and the second operational state during the second time interval.

7. The method of claim 1, wherein determining a transition between the first operational state and the second operational state includes determining that the transition is from one state to a different state, as opposed to remaining in the same operational state.

8. The method of claim 1, wherein determining the plurality of time intervals includes determining the plurality of time intervals for two or more printing devices, and
    wherein determining the matrix of transition coefficients includes determining a coefficient for a shared Markov chain.

9. The method of claim 1, wherein determining the plurality of time intervals includes determining the plurality of time intervals for two or more printing devices, wherein the two or more printing devices are each associated with respective Markov Chains and coefficients.

10. A non-transitory, computer-readable medium, having instructions stored thereon, that, when executed by one or more processors in at least one of a printing device and a server connected to the printing device, cause performance of a set of acts comprising:
    determining a plurality of time intervals for the printing device including a first time interval and a second time interval;
    determining a first number of pages printed by the printing device during the first time interval and a second number of pages printed by the printing device during the second time interval;
    determining a first number of printing-device errors that occur on the printing device during the first time interval and a second number of printing-device errors that occur on the printing device during the second time interval, wherein each printing-device error has a corresponding error type;
    calculating a first ratio of pages printed per error, based on the first number of pages and the first number of printing-device errors, and calculating a second ratio of pages printed per error, based on the second number of pages and the second number of printing-device errors;
    comparing the first ratio to one or more predetermined thresholds, and comparing the second ratio to the one or more predetermined thresholds;
    determining, based on the comparison of the first ratio with the one or more predetermined thresholds, a first operational state of the printing device during the first time interval, wherein the first operational state is one of two or more operational states;
    determining, based on the comparison of the second ratio with the one or more predetermined thresholds, a second operational state of the printing device during the second time interval, wherein the second operational state is different from the first operational state and is one of the two or more operational states;
    determining a matrix of transition coefficients of a Markov chain between the first operational state during the first time interval and the second operational state during the second time interval;

based on the determined matrix of transition coefficients of the Markov chain between the first operational state during the first time interval and the second operational state during the second time interval, determining a current operational status of the printing device; and based on the current operational status, performing, by the server connected to the printing device, a maintenance action for the printing device.

11. The non-transitory, computer-readable medium of claim 10, the set of acts further comprising:

based on the determined current operational status of the printing device, transmitting a message indicating the current operational status of the printing device.

12. The non-transitory, computer-readable medium of claim 10, wherein the printing device is a first printing device of a plurality of printing devices, and wherein determining the current operational status of the printing device based on the determined matrix of transition coefficients of the Markov chain between the first operational state during the first time interval and the second operational state during the second time interval further comprises:

determining the current operational status of each of the plurality of printing devices based on the determined matrix of transition coefficients of the Markov chain between the first operational state during the first time interval and the second operational state during the second time interval.

13. A system comprising:

one or more processors in at least one of a printing device and a server connected to the printing device; and a memory storage having instructions stored thereon that when executed by the one or more processors cause the system to perform a set of acts comprising:

determining a plurality of time intervals for the printing device including a first time interval and a second time interval;

determining a first number of pages printed by the printing device during the first time interval and a second number of pages printed by the printing device during the second time interval;

determining a first number of printing-device errors that occur on the printing device during the first time interval and a second number of printing-device errors that occur on the printing device during the second time interval, wherein each printing-device error has a corresponding error type;

calculating a first ratio of pages printed per error, based on the first number of pages and the first number of printing-device errors, and calculating a second ratio of pages printed per error, based on the second number of pages and the second number of printing-device errors;

comparing the first ratio to one or more predetermined thresholds, and comparing the second ratio to the one or more predetermined thresholds;

determining, based on the comparison of the first ratio with the one or more predetermined thresholds, a first operational state of the printing device during the first time interval, wherein the first operational state is one of two or more operational states;

determining, based on the comparison of the second ratio with the one or more predetermined thresholds, a second operational state of the printing device during the second time interval, wherein the second operational state is different from the first operational state and is one of the two or more operational states;

determining a matrix of transition coefficients of a Markov chain between the first operational state during the first time interval and the second operational state during the second time interval;

based on the determined matrix of transition coefficients of the Markov chain between the first operational state during the first time interval and the second operational state during the second time interval, determining a current operational status of the printing device; and based on the current operational status, performing, by the server connected to the printing device, a maintenance action for the printing device.

14. The system of claim 13, wherein the printing device has a counter that is incrementally increased for each page printed by the printing device, and wherein determining the first and second numbers of pages printed by the printing device during the first and second time intervals comprises determining the first and second numbers of pages based on the counter.

15. The system of claim 13, the set of acts further comprising:

based on the determined current operational status of the printing device, classifying the printing device as either healthy, unhealthy, or unknown.

16. The system of claim 13, the set of acts further comprising:

based on the determined current operational status of the printing device, transmitting a message indicating the status of the printing device.

* * * * *